May 10, 1949.   L. L. SIMKINS   2,469,703
SHORT CIRCUIT DETECTOR
Filed April 20, 1946
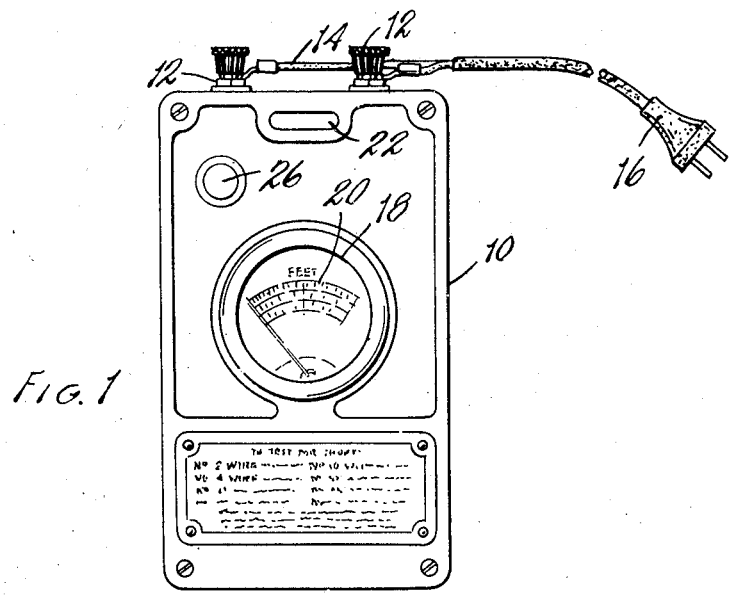
FIG. 1
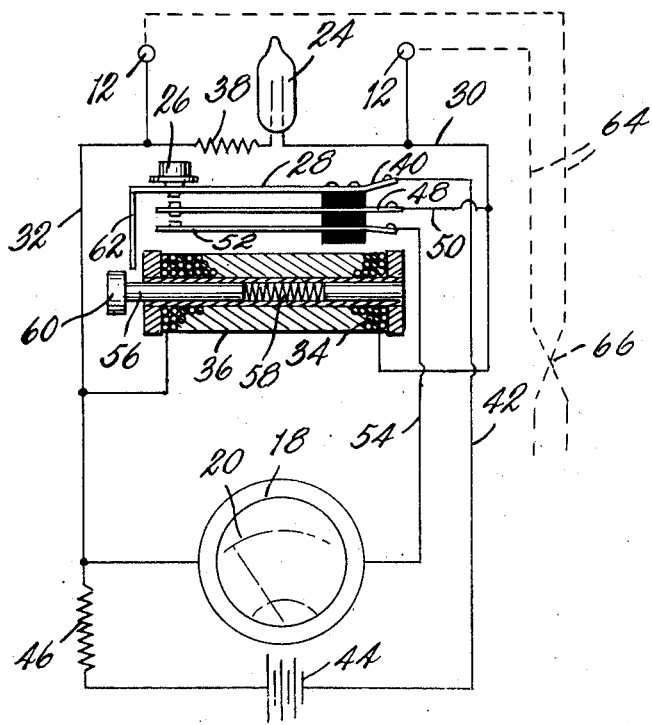
FIG. 2
INVENTOR.
Leon L. Simkins
BY 
ATTORNEYS.

Patented May 10, 1949

2,469,703

UNITED STATES PATENT OFFICE 2,469,703

SHORT CIRCUIT DETECTOR

Leon L. Simkins, Kalamazoo, Mich., assignor to The Wigginton Company, Kalamazoo, Mich.

Application April 20, 1946, Serial No. 663,694

7 Claims. (Cl. 175—183)

1

This invention relates to improvements in short circuit detector.

It has previously been the practice to locate short circuits in electric wiring by means of an external battery and a meter for measuring the voltage drop over a known portion of the test circuit as a measure of the resistance and therefor the length of the circuit being tested. This practice is satisfactory, but has the fault that if the external meter and battery are connected to a circuit carrying relatively high voltage the meter and test instrument will be seriously damaged.

It is therefore the primary object of this invention to provide a testing instrument which is simple and compact and which has means therein for automatically protecting the instrument against the accidental application of high voltages.

The preferred embodiment of the invention is illustrated in the accompanying drawings of which there is one sheet, and what is believed to be new and patentable will be apparent from a consideration of the following description and claims.

Fig. 1 represents a front elevational view of the commercial form of the invention; and Fig. 2 represents a composite view showing the wiring of the instrument in schematic form and showing the protective feature of the invention in cross section.

In the drawings in which like reference characters have been used to indicate like parts, the reference character 10 indicates the instrument case generally. The case is provided with terminals 12 which may conveniently be attached by wires 14 to a conventional prong type electric plug 16 or to other conductors for connecting the instrument to the circuit to be tested.

Mounted in the case 10 is an ohm meter 18 which may have its dial calibrated as at 20 in terms of feet of the more commonly used sizes of electric wire.

Above the meter 18 is a window 22 through which a neon tube 24 is visible to the operator. A push button 26 also extends through the top of the case for the operation of a switch 28 which is more particularly illustrated in Fig. 2.

The terminals 12 are connected within the case of the instrument to the conductors 30 and 32,

2 the conductor 30 leading to the coil 34 of a solenoid 36 and from thence to the conductor 32 so that the coil of the solenoid is directly connected across the terminals 12. The neon tube 24 in series with a suitable resistor 38 is also connected directly across the terminals 12.

The upper leaf 40 of the switch 28 is connected by means of the conductor 42 to the battery 44 and from there through the resistor 46 to the conductor 32 and the terminal 12. The middle leaf 48 of the switch 28 is connected by the conductor 50 to the conductor 30 and the bottom leaf 52 is connected by means of the conductor 54 to the meter 20 and from there to the conductor 32.

From the above connections it should be apparent that when the switch 28 is closed by depressing the button 26, the meter 20 is placed directly across the contacts 12 through the conductor 54 lower leaf 52, middle leaf 48 and conductor 50, while the battery 44 is directly connected across the terminals 12 through the conductor 42, upper leaf 40 and middle leaf 48.

Returning now to a more detailed consideration of the solenoid 36 it will be noted that the solenoid is provided with a core 56 which is biased toward its outward or open position by the coil spring 58. The outer end of the core 56 is provided with an enlarged tip 60 which abuts against the end of the solenoid when the core is drawn into the coil by the passage of current through the coil.

The upper leaf of the switch 28 is provided at its free end with a downwardly bent projection 62 which is arranged to engage the enlarged tip 60 of the core when the solenoid is in energized position, but which is free to be depressed sufficiently to close the switch 28 when the solenoid is in de-energized position as shown in the drawing.

From the above it should be apparent that if the terminals 12 are connected across an energized electric circuit, the current will flow immediately through the solenoid 36, thus retracting the core 56 so that the button 26 cannot be depressed to close the switch 28. It is thus impossible for the operator to connect the meter 20 and battery 44 across an energized electric circuit.

As a further indication of energy in the line being tested, the neon tube 24 will light up if there is a substantial voltage in the circuit. However, if the circuit being tested contains no dangerous current the solenoid will not be energized and the switch 28 may then be closed. Current from the battery 44 will then pass through the conductors being tested, indicated by the dotted lines 64 to a short circuit indicated at 66 at some point in the wiring which it is desired to determine.

The meter 20 will respond to the voltage across the battery 44 and resistor 46. When there is a short in the circuit being tested, current will flow causing a voltage drop through the resistor below the no-current or full voltage of the battery. By pre-calibration of the meter dial this may be read directly in terms of ohms or feet to the short.

For practical use in the usual 110 volt to 480 volt wiring system I have found that a solenoid of approximately 2000 ohms resistance and a meter having approximately $1/100$ ohms resistance together with a 1½ volt battery and a 1½ ohm resistance in the battery circuit gives a satisfactory operating circuit.

I have described and illustrated my invention in highly practical embodiments thereof. No attempt has been made to illustrate or describe other adaptations or embodiments as is it believed this disclosure will enable those skilled in the art to adapt the invention as may be desired.

Having thus described my invention, what I claim as new and desire to secure by Letters Patent is:

1. An electrical testing instrument comprising means for connecting said instrument across a circuit to be tested, visual indicating means electrically connected across said connecting means, an electromagnet connected across said connecting means, a meter, a power source, and manually operable normally open switch means for connecting said meter and said power source across said first mentioned connecting means, said electromagnet being arranged to render said switch means inoperative when said electromagnet is energized.

2. An electric testing instrument comprising a pair of terminals for connecting said instrument across a circuit to be tested, visual indicating means connected across said terminals, an electromagnet connected across said terminals, an armature in said magnet and biased toward an open position, a meter, a power source, and manually operable normally open switch means arranged to connect said meter and said power source in parallel between said terminals, said switch means being engageable with said armature to prevent operation of said switch means when said electro-magnet is energized.

3. An electrical testing instrument comprising a pair of terminals adapted to be connected to the circuit to be tested, an electromagnet permanently connected to the said terminals, a meter permanently connected to one of said terminals, a power source permanently connected to one of said terminals, a normally open switch means for temporarily connecting said meter and said power source to the other of said terminals and means actuated by said electro-magnet for preventing the operation of said switch means.

4. An electrical testing instrument comprising, a meter, a power source, a manually operable normally open switch, a pair of terminals for connecting said instrument to a circuit to be tested, said switch being arranged to connect said meter and said power source in parallel and to connect both said meter and said power source between said terminals, and an electromagnet permanently connected between said terminals and arranged to prevent operation of said switch means when said electromagnet is energized.

5. An electrical testing instrument comprising, a meter, a power source, an electromagnet, a pair of terminals for connecting said instrument to a circuit to be tested, conductor means for connecting said meter, power source and electromagnet to one of said terminals, other conductor means connecting said electromagnet to the other of said terminals, a normally open switch having one contact connected to said meter, another contact connected to said power source and another contact connected to said other terminal, manually operable means for bringing all of said contacts into electrical connection, blocking means associated with said electromagnet and means carried by one of said contacts engageable with said blocking means to prevent operation of said manually operable means.

6. An electrical testing instrument comprising a pair of terminals adapted to be connected to the circuit to be tested, an electromagnet permanently connected across the said terminals, a meter permanently connected to one of said terminals, a power source permanently connected to one of said terminals, a resistor in series with said power source, normally open switch means for temporarily connecting said meter and said power source to the other of said terminals, and means actuated by said electromagnet for preventing the operation of said switch means.

7. An electrical testing instrument comprising a pair of terminals adapted to be connected to a circuit to be tested, an electromagnet permanently connected across said terminals, a meter permanently connected to one of said terminals, a power source permanently connected to one of said terminals, a manually actuated normally open switch member for temporarily connecting said meter and said power source to the other of said terminals and a stop movable into and out of stop position relative to said switch member and actuated to stop position by said electromagnet.

LEON L. SIMKINS.

REFERENCES CITED

The following references are of record in the file of this patent:

UNITED STATES PATENTS

| Number | Name | Date |
| --- | --- | --- |
| 2,325,179 | Doering | July 27, 1943 |

OTHER REFERENCES

Radio Craft, January 1945, page 219.